US011722512B2

(12) United States Patent
Vasudevan et al.

(10) Patent No.: US 11,722,512 B2
(45) Date of Patent: Aug. 8, 2023

(54) FRAMEWORK TO QUANTIFY SECURITY IN DEVOPS DEPLOYMENTS (71) Applicant: EMC IP Holding Company LLC, Hopkinton, MA (US)

(72) Inventors: Mahadevan Vasudevan, Westborough, MA (US); Hanumesh Jojode, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 264 days.

(21) Appl. No.: 17/147,015

(22) Filed: Jan. 12, 2021

(65) Prior Publication Data

US 2022/0224709 A1   Jul. 14, 2022

(51) Int. Cl.
*G06F 21/00* (2013.01)
*H04L 9/40* (2022.01)
*G06F 8/60* (2018.01)

(52) U.S. Cl.
CPC ............ *H04L 63/1433* (2013.01); *G06F 8/60* (2013.01)

(58) Field of Classification Search
CPC ....... H04L 63/1433; H04L 63/20; G06F 8/60; G06F 8/71; G06F 21/577; G06F 21/606; G06F 21/6218
See application file for complete search history.

(56) References Cited

U.S. PATENT DOCUMENTS

| 10,003,607 | B1  |    | 6/2018  | Kolman et al. |
| 10,015,185 | B1  |    | 7/2018  | Kolman et al. |
| 10,419,449 | B1  |    | 9/2019  | Agranonik et al. |
| 10,484,430 | B2  | *  | 11/2019 | Prasad ................. H04L 63/107 |
| 10,929,923 | B1  | *  | 2/2021  | Nguyen ............... G06Q 40/025 |
| 11,082,442 | B1  |    | 8/2021  | Kolman et al. |
| 11,132,278 | B2  |    | 9/2021  | Joyce et al. |
| 11,222,123 | B2  | *  | 1/2022  | Stoler ................ G06F 9/45558 |
| 2010/0257015 | A1 | * | 10/2010 | Molander ............. G06Q 10/06 707/E17.014 |
| 2012/0159494 | A1 | *  | 6/2012  | Shafiee ................. G06F 9/5038 718/102 |
| 2017/0034023 | A1 | *  | 2/2017  | Nickolov ............ H04L 43/0817 |
| 2019/0180039 | A1 | *  | 6/2019  | Considine ........... G06F 21/6218 |
| 2019/0205542 | A1 | *  | 7/2019  | Kao .......................... G06F 8/10 |
| 2019/0227845 | A1 | *  | 7/2019  | Sridhar ................ G06F 9/5044 |
| 2020/0387357 | A1 | *  | 12/2020 | Mathon ................. G06F 9/4411 |
| 2020/0401397 | A1 | *  | 12/2020 | Thomas ............... G06K 9/6267 |
| 2021/0326451 | A1 | *  | 10/2021 | Nuñez Di Croce ........ H04L 63/1433 |
| 2022/0021652 | A1 | *  | 1/2022  | Moghe ................ H04L 63/0236 |

(Continued)

*Primary Examiner* — Don G Zhao
(74) *Attorney, Agent, or Firm* — BainwoodHuang (57) ABSTRACT Techniques for providing a framework that quantifies security in DevOps deployments. The framework includes receiving parameters pertaining to specified factors relevant to security in multiple stages of a DevOps deployment, generating measurement values of the received parameters, calculating a score indicative of an overall level of security in the DevOps deployment based on an aggregation of the measurement values, and, in response to a comparison result of the calculated score against a predetermined threshold, detecting and identifying at least one security gap in the DevOps deployment. In this way, the detection and identification of potential gaps in DevOps security can be made earlier (or "shifted left"), allowing them to be addressed and/or mitigated with reduced DevOps downtime or failure.

14 Claims, 5 Drawing Sheets

(56) References Cited

U.S. PATENT DOCUMENTS

| | | |
|---|---|---|
| 2022/0091858 A1* | 3/2022 | Chivukula .......... H04L 63/0272 |
| 2022/0121480 A1* | 4/2022 | Chivukula ................ G06F 9/48 |
| 2022/0279004 A1* | 9/2022 | Erlingsson .............. G06F 9/545 |

* cited by examiner

Fig. 4

FRAMEWORK TO QUANTIFY SECURITY IN DEVOPS DEPLOYMENTS

BACKGROUND

The term, "DevOps," refers to a range of practices that allow development and operations teams to accelerate the development and deployment of software application products through automation, collaboration, feedback, and iterative improvement. Such practices are implemented in several development and operations stages, using tools that help facilitate automation in each stage. The development stages typically include a "plan" stage, a "code" stage, a "build" stage, and a "test" stage. The operations stages typically include a "deployment" stage, an "operate" stage, and a "monitor" stage. Feedback from the monitor stage is fed back to the plan stage. The development and operations stages are brought together by an "integrate" stage, which uses tools to automate sending of a software application product from the build and test stages to the deployment stage. The development, operations, and integrate stages define a DevOps lifecycle of continuous integration (CI) and continuous deployment (CD).

SUMMARY

Implementing DevOps practices can be challenging due in no small part to the frequently conflicting goals of development/operations teams and security teams. Whereas the development and operations teams may wish to push software application products through the various stages of the DevOps lifecycle as quickly as possible, the security teams may be focused on the detection and elimination of security flaws, which can slow down the successful development and/or deployment of the software application products. For example, such security flaws may derive from the various automation tools used in the development and operations stages of the DevOps lifecycle, inadequate controls for privileged access and secrets management, code and/or network vulnerabilities, poor configuration management, and so on. While such security flaws have traditionally been addressed on an ad hoc basis, a more unified approach to addressing security in DevOps deployments is needed.

Techniques are disclosed herein for providing a framework that quantifies security in DevOps deployments. The framework can be used to obtain quantifiable measurements of specified factors relevant to DevOps security, including, but not limited to, access control lists and/or privileges, code scan results, static code analysis, certificate infrastructures, firewall rules, compliance information, data encryption, and so on. The framework can include a plurality of worker threads, application programming interfaces (APIs), and/or automated programs (or "bots") instantiated across multiple processing devices in a DevOps deployment, from planning to monitoring. The framework can further include a central (or hub) computer configured to receive, from the worker threads/APIs/bots, various parameters pertaining to the specified factors relevant to security in multiple stages of the DevOps lifecycle. Having received the various parameters from the worker threads/APIs/bots, the central (or hub) computer can generate measurement values of the received parameters and calculate a score indicative of an overall level of security in the DevOps deployment based on an aggregation of the measurement values. In response to a comparison result of the calculated score against a predetermined threshold, the central (or hub) computer can detect or identify at least one security gap in the DevOps deployment based on an analysis of the received parameters and provide recommendations for remediation.

By providing a framework for receiving parameters pertaining to specified factors relevant to security in multiple stages of a DevOps lifecycle, generating measurement values of the received parameters, calculating a score indicative of an overall level of security in a DevOps deployment based on an aggregation of the measurement values, and, in response to a comparison result of the calculated score against a predetermined threshold, detecting and identifying at least one security gap in the DevOps deployment, the detection and identification of potential gaps in DevOps security can be made earlier (or "shifted left"), allowing them to be addressed and/or mitigated with reduced DevOps downtime or failure.

In certain embodiments, a method of providing a framework that quantifies security in a DevOps deployment includes receiving, at a central computer, parameters pertaining to specified factors relevant to security in one or more stages of a DevOps lifecycle, generating, by the central computer, measurement values of the received parameters, calculating, by the central computer, a score indicative of an overall level of security in the DevOps deployment based on an aggregation of the measurement values, and, in response to the calculated score exceeding a predetermined threshold, identifying at least one security gap in the DevOps deployment based at least on one or more of the received parameters.

In certain arrangements, the method further includes receiving the parameters pertaining to the specified factors relevant to security at a client level of the DevOps deployment.

In certain arrangements, the method further includes receiving the parameters pertaining to the specified factors relating to one or more of role-based access control (RBAC), data-at-rest encryption, and configuration management at the client level.

In certain arrangements, the method further includes receiving the parameters pertaining to the specified factors relevant to security at a network level of the DevOps deployment.

In certain arrangements, the method further includes receiving the parameters pertaining to the specified factors relating to one or more of data-in-flight encryption and security ports access at the network level.

In certain arrangements, the method further includes receiving the parameters pertaining to the specified factors relevant to security at an application level of the DevOps deployment.

In certain arrangements, the method further includes receiving the parameters pertaining to the specified factors relating to one or more of firewall setup, certificates and code signing, data-at-rest encryption, access privileges, and anomaly-based intrusion detection at the application level.

In certain arrangements, the method further includes generating the measurement values based on the client level, the network level, and the application level of the DevOps deployment from which the parameters were received.

In certain arrangements, the method further includes generating the measurement values based on the specified factors relevant to DevOps security at the client level, the network level, and the application level of the DevOps deployment.

In certain arrangements, the method further includes performing an analysis of the received parameters.

In certain arrangements, the method further includes, having identified the at least one security gap in the DevOps deployment, generating one or more recommendations for remediation of the at least one security gap.

In certain arrangements, the method further includes generating a report containing at least the calculated score, the specified factors contributing to the calculated score, and the recommendations for remediation of the at least one security gap.

In certain arrangements, the DevOps deployment is deemed to be compliant with specified audit regulations if the calculated score does not exceed the predetermined threshold. The method further includes, in response to performing remediation of the at least one security gap in the DevOps deployment, iteratively performing the receiving of the parameters, the generating of the measurement values, and the calculating of the score until the calculated score does not exceed the predetermined threshold.

In certain embodiments, a system for providing a framework that quantifies security in a DevOps deployment includes a central computer communicably coupleable, over a network, to one or more client processing devices, one or more server processing devices, and one or more network processing devices. The central computer includes processing circuitry configured to execute program instructions out of a memory to receive parameters pertaining to specified factors relevant to security in one or more stages of a DevOps lifecycle, generate measurement values of the received parameters, calculate a score indicative of an overall level of security in the DevOps deployment based on an aggregation of the measurement values, and, in response to the calculated score exceeding a predetermined threshold, identify at least one security gap in the DevOps deployment based at least on one or more of the received parameters.

In certain arrangements, the processing circuitry is further configured to execute the program instructions out of the memory to receive the parameters pertaining to the specified factors relevant to security at a client level of the DevOps deployment.

In certain arrangements, the processing circuitry is further configured to execute the program instructions out of the memory to receive the parameters pertaining to the specified factors relevant to security at a network level of the DevOps deployment.

In certain arrangements, the processing circuitry is further configured to execute the program instructions out of the memory to receive the parameters pertaining to the specified factors relevant to security at an application level of the DevOps deployment.

In certain arrangements, the processing circuitry is further configured to execute the program instructions out of the memory to generate the measurement values based on the client level, the network level, and the application level of the DevOps deployment from which the parameters were received.

In certain arrangements, the processing circuitry is further configured to execute the program instructions out of the memory to generate the measurement values based on the specified factors relevant to DevOps security at the client level, the network level, and the application level of the DevOps deployment.

In certain embodiments, a computer program product includes a set of non-transitory, computer-readable media having instructions that, when executed by processing circuitry, cause the processing circuitry to perform a method of providing a framework that quantifies security in a DevOps deployment. The method includes receiving, at a central computer, parameters pertaining to specified factors relevant to security in one or more stages of a DevOps lifecycle, generating, by the central computer, measurement values of the received parameters, calculating, by the central computer, a score indicative of an overall level of security in the DevOps deployment based on an aggregation of the measurement values, and, in response to the calculated score exceeding a predetermined threshold, identifying at least one security gap in the DevOps deployment based at least on one or more of the received parameters.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 1b is a block diagram of an exemplary processing device that can be employed throughout the DevOps environment of FIG. 1a;

FIG. 1c is a block diagram of an exemplary security monitoring central (or hub) computer that can be employed in the DevOps environment of FIG. 1a;

DETAILED DESCRIPTION

Techniques are disclosed herein for providing a framework that quantifies security in DevOps deployments. The framework can include receiving parameters pertaining to specified factors relevant to security in multiple stages of a DevOps lifecycle, generating measurement values of the received parameters, calculating a score indicative of an overall level of security in a DevOps deployment based on an aggregation of the measurement values, and, in response to a comparison result of the calculated score against a predetermined threshold, detecting and identifying at least one security gap in the DevOps deployment. In this way, the detection and identification of potential gaps in DevOps security can be made earlier (or "shifted left"), allowing them to be addressed and/or mitigated with reduced DevOps downtime or failure.

Figure 1A:
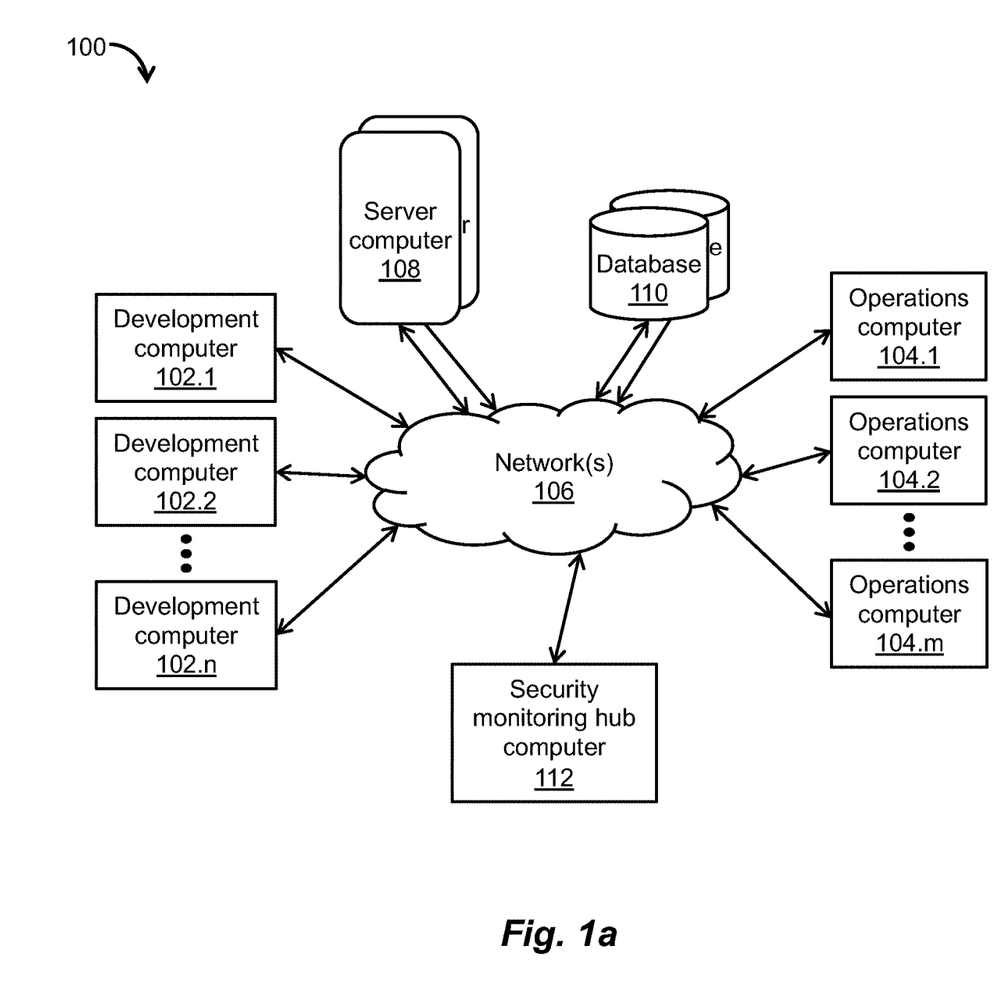
FIG. 1a is a block diagram of an exemplary DevOps environment, in which techniques can be practiced for providing a framework that quantifies security in DevOps deployments.

FIG. 1a depicts an illustrative embodiment of an exemplary DevOps environment 100, in which techniques can be practiced for providing a framework that quantifies security in DevOps deployments (also referred to herein as the "DevOps security framework"). As shown in FIG. 1a, the DevOps environment 100 can include a plurality of development computers 102.1, 102.2, . . . , 102.n and a plurality of operations computers 104.1, 104.2, . . . , 104.*m* interconnected by one or more networks 106. For example, the development computers 102.1, . . . , 102.*n* and the operations computers 104.1, . . . , 104.*m* may be employed in a DevOps approach to the design and development of software application products, in which development and operations teams work together in an environment that fosters automation, collaboration, feedback, and iterative improvement. The DevOps environment 100 can further include one or more server computers 108, one or more databases 110, and a security monitoring central (or hub) computer 112. The network(s) 106 can include a plurality of network processing devices configured to interconnect the development computers 102.1, . . . , 102.*n*, the operations computers 104.1, . . . , 104.*m*, the server computer(s) 108, the database(s) 110, and the security monitoring hub computer 112 to enable them to communicate and exchange data and/or control signaling. As such, the network(s) 106 can include copper-based data communications devices and cabling, fiber optic devices and cabling, wireless devices, and so on, or any suitable combination thereof. The network(s) 106 can also be configured to support local area network (LAN)-based communications, metropolitan area network (MAN)-based communications, wide area network (WAN)-based communications, wireless communications, and/or any other suitable network communications.

Figure 1B:
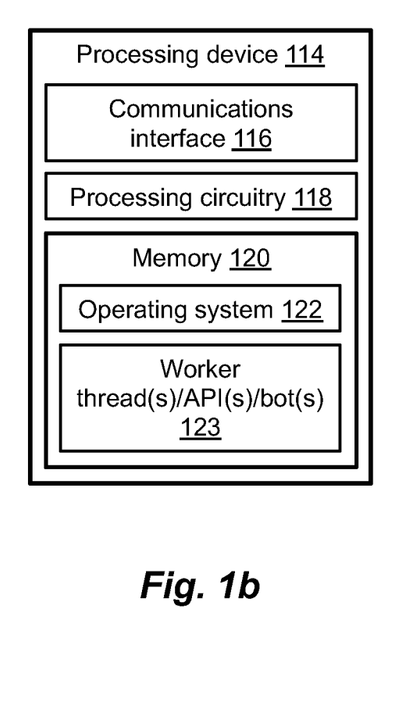

FIG. 1*b* depicts an exemplary processing device 114 that can be employed in the DevOps environment 100 of FIG. 1*a*. For example, client processing devices such as the development computers 102.1, . . . , 102.*n* and the operations computers 104.1, . . . , 104.*m*, server processing devices such as the server computers 108, as well as the network processing devices in the network(s) 106, may each be configured like the processing device 114 of FIG. 1*b*. As shown in FIG. 1*b*, the processing device 114 can include a communications interface 116, processing circuitry 118, and a memory 120. The communications interface 116 can include one or more of an Ethernet interface, an InfiniBand interface, a fiber channel interface, and/or any other suitable communications interface. The communications interface 116 can further include SCSI target adapters, network interface adapters, and/or any other suitable adapters for converting electronic, optical, and/or wireless signals received over the network(s) 106 to a form suitable for use by the processing circuitry 118. The memory 120 can include volatile memory such as random-access memory (RAM), as well as persistent memory such as nonvolatile RAM (NVRAM), read-only memory (ROM), one or more hard disk drives (HDDs), one or more solid-state drives (SSDs), or any other suitable persistent memory. The memory 120 can also store a variety of software constructs realized in the form of program instructions, which can be executed by the processing circuitry 118 to carry out tasks within the DevOps environment 100. The memory 120 can further include an operating system 122 such as the Linux operating system (OS), Unix OS, Windows OS, or any other suitable operating system, as well as one or more worker threads, application programming interfaces (APIs), or automated programs (or "bots") 123. As described hereinbelow, such worker thread(s)/API(s)/bot(s) can be instantiated on the client processing devices, the server processing devices, and the network processing devices within the DevOps environment 100 to effectuate communications with the security monitoring hub computer 112. The processing circuitry 118 can include one or more physical processors, controllers, input/output (IO) modules, and/or any other suitable computer hardware or combination thereof.

Figure 1C:
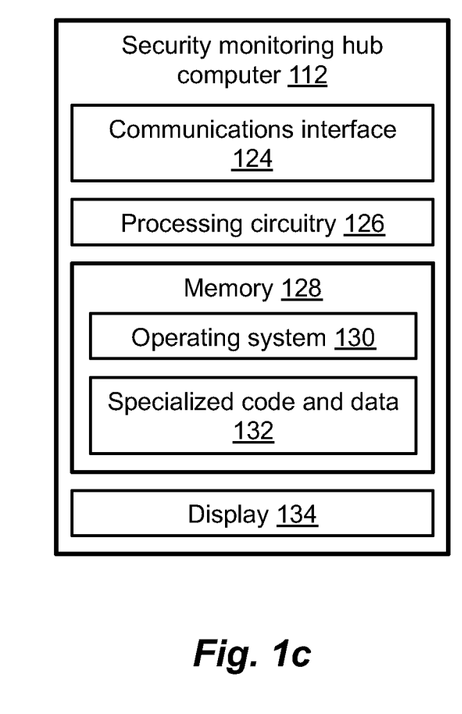

FIG. 1*c* depicts a detailed view of the security monitoring hub computer 112 of FIG. 1*a*. As shown in FIG. 1*c*, the security monitoring hub computer 112 can include a communications interface 124, processing circuitry 126, a memory 128, and a display 134. Like the communications interface 116 of the processing device 114 (see FIG. 1*b*), the communications interface 124 of the security monitoring hub computer 112 can include one or more of an Ethernet interface, an InfiniBand interface, a fiber channel interface, and/or any other suitable communications interface. The communications interface 124 can further include SCSI target adapters, network interface adapters, and/or any other suitable adapters for converting electronic, optical, and/or wireless signals received over the network(s) 106 to a form suitable for use by the processing circuitry 126. The memory 128 can include volatile memory such as RAM, as well as persistent memory such as NVRAM, ROM, one or more HDDs, one or more SSDs, and/or any other suitable persistent memory. The memory 128 can also store a variety of software constructs realized in the form of specialized code and data 132 (e.g., program instructions) that can be executed by the processing circuitry 126 to carry out the techniques and/or methods disclosed herein. The memory 128 can further include an operating system 130, such as the Linux OS, Unix OS, Windows OS, or any other suitable operating system. The processing circuitry 126 can include one or more physical processors, controllers, IO modules, and/or any other suitable computer hardware or combination thereof. The display 134 can be configured to present, to a user, visual information such as text and/or graphics, multimedia data, and so on.

In the context of the processing circuitry 126 being implemented using one or more processors executing the specialized code and data 132, a computer program product can be configured to deliver all or a portion of the specialized code and data 132 to the respective processor(s). Such a computer program product can include one or more non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

Figure 2:
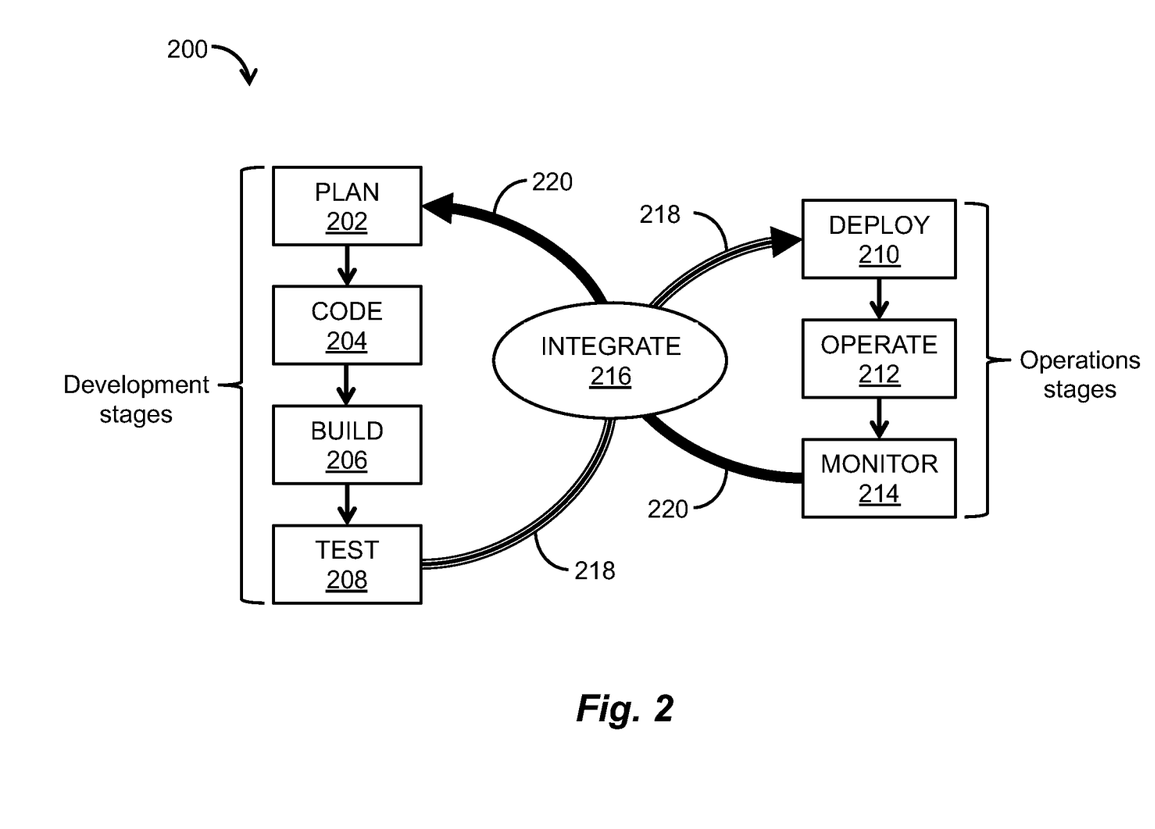
FIG. 2 is a block diagram of exemplary development, operations, and integrate stages that define a DevOps lifecycle of continuous integration (CI) and continuous deployment (CD)

FIG. 2 depicts exemplary development, operations, and integrate stages that define a DevOps lifecycle 200 of continuous integration (CI) and continuous deployment (CD). As shown in FIG. 2, the DevOps lifecycle 200 can include a plurality of development stages, namely, a "plan" stage 202, a "code" stage 204, a "build" stage 206, and a "test" stage 208. As further shown in FIG. 2, the DevOps lifecycle 200 can also include a plurality of operations stages, namely, a "deploy" stage 210, an "operate" stage 212, and a "monitor" stage 214. Each of the development stages 202, 204, 206, 208 corresponds to one or more development tasks that can be performed on one or more of the development computers 102.1, . . . , 102.*n* in the DevOps environment 100. Likewise, each of the operations stages 210, 212, 214 corresponds to one or more operations tasks that can be performed on one or more of the operations computers 104.1, . . . , 104.*m* in the DevOps environment 100. The DevOps lifecycle 200 can further include an "integrate" stage 216, which can effectively integrate the development stages 202, 204, 206, 208 with and the operations stages 210, 212, 214.

In an accelerated DevOps scenario for developing a software application product, one or more of the development computers 102.1, . . . , 102.n in a development environment can be employed to develop functional blocks of the software application product, which can be continuously integrated and continuously deployed over the network(s) 106, and essentially immediately monitored and checked by one or more of the operations computers 104.1, . . . , 104.n in an operations (or production) environment. Based on results of the monitoring and checking, feedback can be sent over the network(s) 106 from the operations computers 104.1, . . . , 104.n to the development computers 102.1, . . . , 102.n, which can make any required and/or desired changes to the functional blocks. Having developed and changed the functional blocks, as required and/or desired, in the development environment, and having iteratively monitored and checked the functional blocks in the operations (or production) environment, they can be put together to build a final software application product. In effect, a "wall" that previously existed between the development and operations (or production) environments has been eliminated, providing increased assurance that the final software application product will function as designed upon delivery to a customer.

With reference to the development stages 202, 204, 206, 208 of the DevOps lifecycle 200, a plan for the software application product can be formulated at the plan stage 202. The formulation of the plan can include deciding which software modules and/or algorithms to use in each functional block of the software application product. For example, the JIRA™ tool or any other suitable commercial or open-source tool(s) may be employed to facilitate automation at the plan stage 202. Having developed the plan for the software application product, it can be coded at the code stage 204, using the GitHub™ tool or any other suitable commercial or open-source tool(s) to provide a repository for storing the code and its different versions. The code can then be made executable at the build stage 206, using the Gradle™ tool, the Maven™ tool, or any other suitable commercial or open-source tool(s). Next, the executable code can be tested at the test stage 208, using the Selenium™ tool or any other suitable commercial or open-source tool(s).

With reference to the operations stages 210, 212, 214 of the DevOps lifecycle 200, once the code has been made executable at the build stage 206 and tested at the test stage 208 in the development environment, it can be sent from the development environment to the deploy stage 210 in the operations (or production) environment, as illustrated by a path 218. Having been sent for deployment, the code can be configured to its desired state at the operate stage 212, using the Ansible™ tool, the Puppet™ tool, the Docker™ tool, or any other suitable commercial or open-source tool(s). The code can then be operated, checked, and monitored at the monitor stage 214, using the Nagios™ tool or any other suitable commercial or open-source tool(s). Feedback from the monitor stage 214 can then be fed back to the plan stage 202, as illustrated by a path 220.

As shown in FIG. 2, the integrate stage 216 can be implemented between the plan, code, build, and test stages 202, 204, 206, 208 in the development environment and the deploy, operate, and monitor stages 210, 212, 214 in the operations (or production) environment, using the Jenkins™ tool or any other suitable commercial or open-source tool(s). Such an integration tool can be used to facilitate automation of the code build and test at the build and test stages 206, 208, respectively, and, if the code passes the tests at the test stage 208, facilitate the code deployment at the deploy stage 210. DevOps automation tools such as the JIRA™ tool, the GitHub™ tool, the Gradle™ tool, the Maven™ tool, the Selenium™ tool, the Ansible™ tool, the Puppet™ tool, the Docker™ tool, the Nagios™ tool, and the Jenkins™ tool are referred to herein collectively as application lifecycle management (ALM) tools. In this way, the DevOps lifecycle 200 of continuous integration (CI) and continuous deployment (CD) can be achieved.

Implementing DevOps practices can be challenging due in no small part to the frequently conflicting goals of development/operations teams and security teams. Whereas the development and operations teams may wish to push software application products through the various stages 202, 204, 206, 208, 210, 212, 214 of the DevOps lifecycle 200 as quickly as possible, the security teams may be focused on the detection and elimination of security flaws, which can slow down the successful development and/or deployment of the software application products. For example, such security flaws may derive from the various ALM tools used in the development and/or operations stages, inadequate controls for privileged access and secrets management, code and/or network vulnerabilities, poor configuration management, and so on. While such security flaws have traditionally been addressed on an ad hoc basis, a more unified approach to addressing security in DevOps deployments is needed.

Techniques are disclosed herein for providing a framework that quantifies security in DevOps deployments. The DevOps security framework can be used to obtain quantifiable measurements of specified factors relevant to DevOps security, including, but not limited to, access control lists and/or privileges, code scan results, static code analysis, certificate infrastructures, firewall rules, compliance information, data encryption, and so on. The DevOps security framework can include a plurality of worker threads, APIs, and/or bots instantiated across multiple client, server, and network processing devices in a DevOps deployment, from planning to monitoring. The DevOps security framework can further include the security monitoring hub computer 112, which can be configured to receive, from the plurality of worker threads/APIs/bots, various parameters pertaining to the specified factors relevant to security in the various stages 202, 204, 206, 208, 210, 212, 214 of the DevOps lifecycle 200. Having received the various parameters from the plurality of worker threads/APIs/bots, the security monitoring hub computer 112 can generate measurement values of the received parameters and calculate a score indicative of an overall level of security in the DevOps deployment based on an aggregation of the measurement values. In response to a comparison result of the calculated score against a predetermined threshold, the security monitoring hub computer 112 can detect or identify at least one security gap in the DevOps deployment based on an analysis of the received parameters and provide recommendations for remediation.

By providing a framework for receiving parameters pertaining to specified factors relevant to security in multiple stages of a DevOps lifecycle, generating measurement values of the received parameters, calculating a score indicative of an overall level of security in a DevOps deployment based on an aggregation of the measurement values, and, in response to a comparison result of the calculated score against a predetermined threshold, detecting and identifying at least one security gap in the DevOps deployment, the detection and identification of potential gaps in DevOps security can be made earlier (or "shifted left"), allowing them to be addressed and/or mitigated with reduced DevOps downtime or failure.

Figure 3:
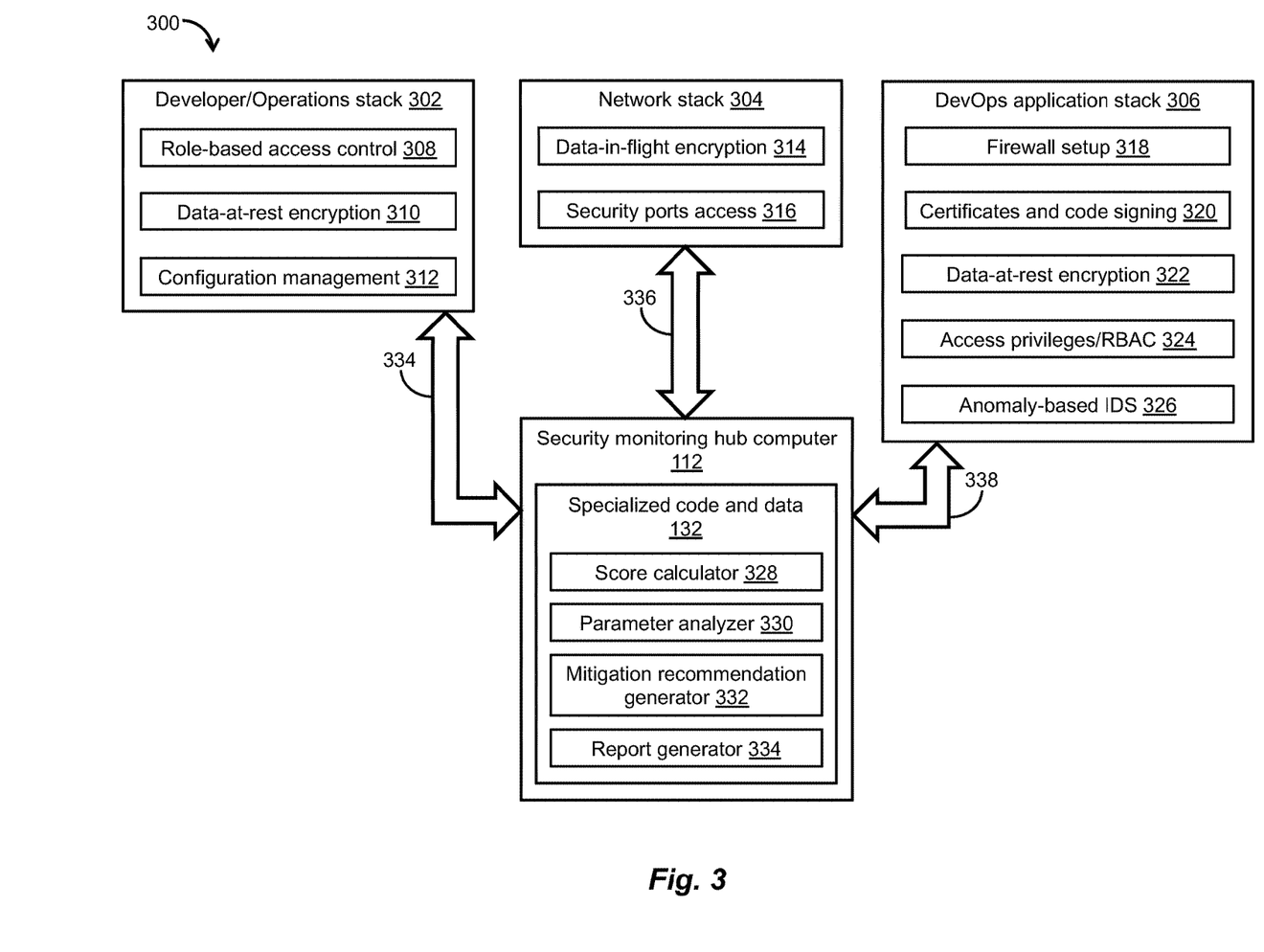
FIG. 3 is a block diagram of an exemplary DevOps application stack, an exemplary network stack, and an exemplary developer and operations stack that can be employed in conjunction with client, server, and network processing devices like the processing device of FIG. 1b, as well as the security monitoring hub computer of FIG. 1c, to implement the framework.

The disclosed techniques for providing a framework that quantifies security in DevOps deployments will be further understood with reference to the following illustrative example, as well as FIGS. 1-3. In this example, it is assumed that a software application product is in a process of development, in accordance with the DevOps lifecycle 200 of FIG. 2. It is further assumed that at least one worker thread, API, or bot is instantiated on each of (i) a plurality of client processing devices such as the development computers 104.1, . . . , 104.m and the operations computers 102.1, . . . , 102.n, (ii) one or more server processing devices such as the server computer(s) 108, and (iii) a plurality of network processing devices in the network(s) 106, within the DevOps environment 100 of FIG. 1.

As described herein, the DevOps environment 100 can include the plurality of development computers 102.1, . . . , 102.n, the plurality of operations computers 104.1, . . . , 104.m, the server computer(s) 108, the database(s) 110, and the security monitoring hub computer 112, all of which can be interconnected by the network(s) 106. As such, security gaps can potentially occur at multiple levels of the DevOps environment 100, including at a client level, a server (or application) level, and a network level. For example, at the client level, tens to hundreds (or even thousands) of the client processing devices 102.1, . . . , 102.n may participate in implementing the development stages 202, 204, 206, 208 of the DevOps lifecycle 200. Likewise, tens to hundreds (or even thousands) of the client processing devices 104.1, . . . , 104.m may participate in implementing the operations stages 210, 212, 214 of the DevOps lifecycle 200. Further, security at the client level may be adversely affected by how the client processing devices 102.1, . . . , 102.n, 104.1, . . . , 104.m interact with one another at the various stages 202, 204, 206, 208, 210, 212, 214 of the DevOps lifecycle 200. In this example, the worker threads, APIs, or bots instantiated on the client processing devices 102.1, . . . , 102.n, 104.1, . . . , 104.m are configured to obtain various parameters pertaining to specified factors relevant to security at the client level of the DevOps environment 100, and to automatically send the obtained parameters to the security monitoring hub computer 112.

FIG. 3 depicts a DevOps security framework 300 that includes a developer/operations stack 302, which can be executed by the worker threads or bots (or by using the worker APIs) instantiated on the client processing devices 102.1, . . . , 102.n, 104.1, . . . , 104.m to obtain the various parameters pertaining to specified factors relevant to security at the client level of the DevOps environment 100. As shown in FIG. 3, the developer/operations stack 302 can include a plurality of software constructs relating to role-based access control (RBAC) 308, data-at-rest encryption 310, and configuration management 312. It is noted that the several software constructs 308, 310, 312 included in the developer/operations stack 302 are meant to be illustrative and not limiting.

In this example, the worker threads or bots instantiated on the client processing devices 102.1, . . . , 102.n, 104.1, . . . , 104.m execute each of the software constructs 308, 310, 312 of the developer/operations stack 302 periodically or at intervals to obtain various parameters pertaining to role-based access control, data-at-rest encryption, and configuration management maintained by the client processing devices 102.1, . . . , 102.n, 104.1, . . . , 104.m, and to automatically send the obtained parameters to the security monitoring hub computer 112, as illustrated by a path 334. For example, by executing the software construct relating to role-based access control 308, the worker threads or bots may obtain parameters indicating whether role-based access control (RBAC) is currently being implemented on none, some, or all of the client processing devices 102.1, . . . , 102.n, 104.1, . . . , 104.m. Further, by executing the software construct relating to data-at-rest encryption 310, the worker threads or bots may obtain parameters indicating whether data-at-rest encryption is currently being implemented on none, some, or all of the client processing devices 102.1, . . . , 102.n, 104.1, . . . , 104.m. In addition, the worker threads or bots may execute the software construct relating to configuration management 312 to obtain parameters indicating whether any misconfigurations exist on none, some, or all of the client processing devices 102.1, . . . , 102.n, 104.1, . . . , 104.m. In some embodiments, such parameters pertaining to role-based access control, data-at-rest encryption, and configuration management can be defined and maintained in (as well as obtained from) configuration files associated with the respective client processing devices 102.1, . . . , 102.n, 104.1, . . . , 104.m.

As shown in FIG. 3, the DevOps security framework 300 further includes a network stack 304, which can be executed by the worker threads or bots (or by using the worker APIs) instantiated on the network processing devices in the network(s) 106 to obtain the various parameters pertaining to specified factors relevant to security at the network level of the DevOps environment 100. As shown in FIG. 3, the network stack 304 can include a plurality of software constructs relating to data-in-flight encryption 314 and security ports access 316. It is noted that the several software constructs 314, 316 included in the network stack 304 are meant to be illustrative and not limiting.

In this example, the worker threads or bots instantiated on the network processing devices in the network(s) 106 execute each of the software constructs 314, 316 of the network stack 304 periodically or at intervals to obtain various parameters pertaining to data-in-flight encryption and security ports access maintained by the network processing devices, and to automatically send the obtained parameters to the security monitoring hub computer 112, as illustrated by a path 336. For example, by executing the software construct relating to data-in-flight encryption 314, the worker threads or bots may obtain parameters indicating whether data-in-flight encryption is currently being implemented on none, some, or all of the network processing devices. Further, by executing the software construct relating to security ports access 316, the worker threads or bots may obtain parameters indicating whether an adequate level of network port security is currently being implemented on none, some, or all of the network processing devices. In some embodiments, such parameters pertaining to data-in-flight encryption and security ports access can be defined and maintained in (as well as obtained from) configuration files associated with the network processing devices in the network(s) 106.

As shown in FIG. 3, the DevOps security framework 300 further includes a DevOps application stack 306, which can be executed by the worker threads or bots (or by using the worker APIs) instantiated on the server processing device(s) 108 to obtain the various parameters pertaining to specified factors relevant to security at the server (or application) level of the DevOps environment 100. As shown in FIG. 3, the DevOps application stack 306 can include a plurality of software constructs relating to firewall setup 318, certificates and code signing 320, data-at-rest encryption 322, access privileges/RBAC 324, and anomaly-based intrusion detection systems (IDS). It is noted that the several software constructs 318, 320, 322, 324, 326 included in the DevOps application stack 306 are meant to be illustrative and not limiting.

In this example, the worker threads or bots instantiated on the server processing device(s) 108 execute each of the software constructs 318, 320, 322, 324, 326 of the DevOps application stack 306 periodically or at intervals to obtain various parameters pertaining to firewall setup, certificates and code signing, data-at-rest encryption, access privileges/RBAC, and anomaly-based IDS maintained by the server processing device(s) 108, and to automatically send the obtained parameters to the security monitoring hub computer 112, as illustrated by a path 338. For example, by executing the software construct relating to firewall setup 318, the worker threads or bots may obtain parameters indicating whether adequate firewall setup and security settings for authentication and authorization are currently being implemented on none, some, or all of the server processing device(s) 108. Further, by executing the software construct relating to certificates and code signing 320, the worker threads or bots may obtain parameters indicating whether an adequate level of code signing verification is currently being implemented on none, some, or all of the server processing device(s) 108. Still further, by executing the software construct relating to data-at-rest encryption 322, the worker threads or bots may obtain parameters indicating whether data-at-rest encryption is currently being implemented on none, some, or all of the server processing device(s) 108. Yet further, by executing the software construct relating to access privileges/RBAC 324, the worker threads or bots may obtain parameters indicating whether role-based access control (RBAC) is currently being implemented on none, some, or all of the server processing device(s) 108. Still yet further, by executing the software construct relating to anomaly-based IDS 326, the worker threads or bots may obtain parameters indicating whether any suspicious events significantly diverging from previously observed events (possibly indicating an incoming intrusion) have been detected on none, some, or all of the server processing device(s) 108. In some embodiments, such parameters pertaining to firewall setup, certificates and code signing, data-at-rest encryption, access privileges/RBAC, and anomaly-based IDS can be defined and maintained in (as well as obtained from) configuration files associated with the server processing device(s) 108.

In this example, the specialized code and data 132 of the security monitoring hub computer 112 includes a score calculator 328, a parameter analyzer 330, a mitigation recommendation generator 332, and a report generator 334. Having received the various parameters pertaining to specified factors relevant to security at the client level, the server (or application) level, and the network level of the DevOps environment 100, the processing circuitry 126 of the security monitoring hub computer 112 executes the score calculator 328 to generate measurement values of the received parameters, and to calculate a score indicative of an overall level of security in the current DevOps deployment based on an aggregation of the measurement values. For example, the score calculator 328 may employ predetermined algorithms to generate the measurement values based on the levels of the DevOps environment 100 from which the various parameters were received (e.g., the client level, the server (or application) level, the network level), the specified factors relevant to DevOps security at those levels (e.g., RBAC, and so on, at the client level; data-in-flight encryption, and so on, at the network level; firewall setup, and so on, at the server (or application) level), specific weights given to each of the specified factors, and so on. Further, the score calculator 328 may compare the calculated score against a predetermined threshold to obtain a comparison result.

Based on the comparison result, the processing circuitry 126 of the security monitoring hub computer 112 can execute the parameter analyzer 330 to detect or identify at least one security gap in the current DevOps deployment by performing an analysis of the received parameters. For example, an analysis of the received parameters may reveal usage patterns at the client level of the DevOps environment 100 that are indicative of nefarious activity, such as a user uploading an unusual amount of file size to the database(s) 110 configured as central data repositories. The analysis of the received parameters may further reveal poor certificate management at the server computer(s) 108 configured as Artifactory servers, leaving them vulnerable to potential "man-in-the-middle" attacks. In the DevOps environment 100, such a man-in-the-middle attack can occur when a malicious party successfully intercepts communications passing between one or more of the client processing devices 102.1, . . . , 102.n, 104.1, . . . , 104.m and the remote server computer(s) 108. Having detected or identified at least one security gap in the current DevOps deployment, the processing circuitry 126 of the security monitoring hub computer 112 can execute the mitigation recommendation generator 332 to generate one or more recommendations for remediation. In addition, the processing circuitry 126 of the security monitoring hub computer 112 can execute the report generator 334 to generate a report containing the calculated score, the specified factors contributing to the calculated score, the recommendations for remediation, and so on. In some embodiments, the generated report can be accessed on the display 134 of the security monitoring hub computer 112 and/or via a secure web portal running on the security monitoring hub computer 112.

Figure 4:
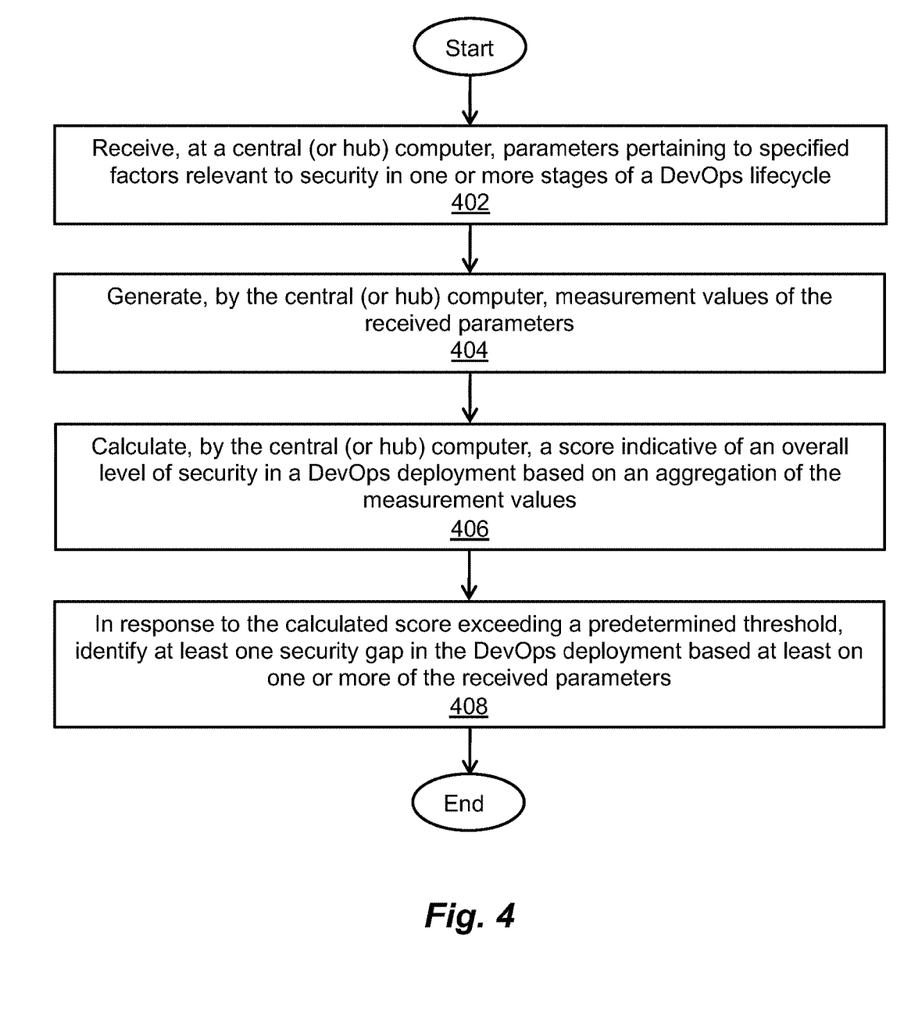
FIG. 4 is an exemplary method of providing a framework that quantifies security in DevOps deployments.

An exemplary method of providing a framework that quantifies security in DevOps deployments is described below with reference to FIG. 4. As depicted in block 402, parameters pertaining to specified factors relevant to security in one or more stages of a DevOps lifecycle are received at a central (or hub) computer. As depicted in block 404, measurement values of the received parameters are generated by the central (or hub) computer. As depicted in block 406, a score indicative of an overall level of security in a DevOps deployment is calculated by the central (or hub) computer based on an aggregation of the measurement values. As depicted in block 408, in response to the calculated score exceeding a predetermined threshold, at least one security gap is identified in the DevOps deployment based at least on one or more of the received parameters.

Having described the above illustrative embodiments, various alternative embodiments and/or variations may be made and/or practiced. For example, having identified at least one security gap in a DevOps deployment, the security posture of the DevOps deployment (as represented by the calculated score) can be improved based on recently discovered cyber threats, compliance and/or audit regulations, and so on. Further, organizations involved in the DevOps deployment may be deemed to be compliant with certain audit regulations if the calculated score does not exceed a predetermined threshold. To achieve such an improvement in the security posture of a DevOps deployment, once any identified security gaps in the DevOps deployment have been remediated, the steps of receiving parameters pertaining to specified factors relevant to security, generating measurement values of the received parameters, and calculating a score based on the aggregated measurement values, can be iteratively performed until the calculated score no longer exceeds the predetermined threshold. In addition, once the desired score has been calculated, organizations involved in the DevOps deployment may obtain certifications of passing a particular audit. In this way, the calculated score may be used as a key metric for determining a DevOps deployment's compliance to certain audit regulations.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of providing a framework that quantifies security in software application development and deployment, comprising:
   receiving, at a central computer, parameters pertaining to specified factors relevant to security in one or more stages of a lifecycle of the software application development and deployment;
   generating, by the central computer, measurement values of the received parameters;
   calculating, by the central computer, a score indicative of an overall level of security in the software application development and deployment based on an aggregation of the measurement values; and
   in response to the calculated score exceeding a predetermined threshold, identifying at least one security gap in the software application development and deployment based at least on one or more of the received parameters,
   wherein the receiving of the parameters pertaining to the specified factors relevant to security includes receiving the parameters pertaining to the specified factors relevant to security at a client level of the software application development and deployment, and
   wherein the receiving of the parameters pertaining to the specified factors relevant to security further includes receiving the parameters pertaining to the specified factors relevant to security at a network level of the software application development and deployment.

2. The method of claim 1 wherein the receiving of the parameters pertaining to the specified factors relevant to security at the client level of the software application development and deployment includes receiving the parameters pertaining to the specified factors relating to one or more of role-based access control (RBAC), data-at-rest encryption, and configuration management at the client level.

3. The method of claim 1 wherein the receiving of the parameters pertaining to the specified factors relevant to security at the network level of the software application development and deployment includes receiving the parameters pertaining to the specified factors relating to one or more of data-in-flight encryption and security ports access at the network level.

4. The method of claim 1 wherein the receiving of the parameters pertaining to the specified factors relevant to security includes receiving the parameters pertaining to the specified factors relevant to security at an application level of the software application development and deployment.

5. The method of claim 4 wherein the receiving of the parameters pertaining to the specified factors relevant to security at the application level of the software application development and deployment includes receiving the parameters pertaining to the specified factors relating to one or more of firewall setup, certificates and code signing, data-at-rest encryption, access privileges, and anomaly-based intrusion detection at the application level.

6. The method of claim 4 wherein the generating of the measurement values of the received parameters includes generating the measurement values based on the client level, the network level, and the application level of the software application development and deployment from which the parameters were received.

7. The method of claim 6 wherein the generating of the measurement values of the received parameters includes generating the measurement values based on the specified factors relevant to software application development and deployment security at the client level, the network level, and the application level of the software application development and deployment.

8. A method of providing a framework that quantifies security in software application development and deployment, comprising:
   receiving, at a central computer, parameters pertaining to specified factors relevant to security in one or more stages of a lifecycle of the software application development and deployment;
   generating, by the central computer, measurement values of the received parameters;
   calculating, by the central computer, a score indicative of an overall level of security in the software application development and deployment based on an aggregation of the measurement values;
   in response to the calculated score exceeding a predetermined threshold, identifying at least one security gap in the software application development and deployment based at least on one or more of the received parameters,
   wherein the identifying of the at least one security gap in the software application development and deployment includes performing an analysis of the received parameters;
   having identified the at least one security gap in the software application development and deployment, generating one or more recommendations for remediation of the at least one security gap; and
   generating a report containing at least the calculated score, the specified factors contributing to the calculated score, and the recommendations for remediation of the at least one security gap.

9. The method of claim 8 wherein the software application development and deployment is deemed to be compliant with specified audit regulations if the calculated score does not exceed the predetermined threshold, and wherein the method further comprises:

in response to performing remediation of the at least one security gap in the software application development and deployment, iteratively performing the receiving of the parameters, the generating of the measurement values, and the calculating of the score until the calculated score does not exceed the predetermined threshold.

10. A system for providing a framework that quantifies security in software application development and deployment, comprising:

a central computer communicably coupleable, over a network, to one or more client processing devices, one or more server processing devices, and one or more network processing devices, wherein the central computer includes processing circuitry configured to execute program instructions out of a memory to:

receive parameters pertaining to specified factors relevant to security in one or more stages of a lifecycle of the software application development and deployment;

generate measurement values of the received parameters;

calculate a score indicative of an overall level of security in the software application development and deployment based on an aggregation of the measurement values; and in response to the calculated score exceeding a predetermined threshold, identify at least one security gap in the software application development and deployment based at least on one or more of the received parameters, wherein the processing circuitry is further configured to execute the program instructions out of the memory to receive the parameters pertaining to the specified factors relevant to security at a client level of the software application development and deployment, and wherein the processing circuitry is further configured to execute the program instructions out of the memory to receive the parameters pertaining to the specified factors relevant to security at a network level of the software application development and deployment.

11. The system of claim 10 wherein the processing circuitry is further configured to execute the program instructions out of the memory to receive the parameters pertaining to the specified factors relevant to security at an application level of the software application development and deployment.

12. The system of claim 11 wherein the processing circuitry is further configured to execute the program instructions out of the memory to generate the measurement values based on the client level, the network level, and the application level of the software application development and deployment from which the parameters were received.

13. The system of claim 12 wherein the processing circuitry is further configured to execute the program instructions out of the memory to generate the measurement values based on the specified factors relevant to software application development and deployment security at the client level, the network level, and the application level of the software application development and deployment.

14. A computer program product including a set of non-transitory, computer-readable media having instructions that, when executed by processing circuitry, cause the processing circuitry to perform a method of providing a framework that quantifies security in software application development and deployment, the method comprising:

receiving, at a central computer, parameters pertaining to specified factors relevant to security in one or more stages of a lifecycle of the software application development and deployment;

generating, by the central computer, measurement values of the received parameters;

calculating, by the central computer, a score indicative of an overall level of security in the software application development and deployment based on an aggregation of the measurement values; and in response to the calculated score exceeding a predetermined threshold, identifying at least one security gap in the software application development and deployment based at least on one or more of the received parameters, wherein the receiving of the parameters pertaining to the specified factors relevant to security includes receiving the parameters pertaining to the specified factors relevant to security at a client level of the software application development and deployment, and wherein the receiving of the parameters pertaining to the specified factors relevant to security further includes receiving the parameters pertaining to the specified factors relevant to security at a network level of the software application development and deployment.

* * * * *